United States Patent [19]

Parro, II

[11] Patent Number: 4,595,976
[45] Date of Patent: Jun. 17, 1986

[54] INVERTER CONTROL

[75] Inventor: Robert C. Parro, II, Rockford, Ill.

[73] Assignee: Sundstrand Corporation, Rockford, Ill.

[21] Appl. No.: 686,985

[22] Filed: Dec. 27, 1984

[51] Int. Cl.[4] .............................................. H02M 1/12
[52] U.S. Cl. ...................................... 363/41; 363/98; 364/486
[58] Field of Search ...................... 363/41, 42, 97, 98, 363/132; 318/810, 811; 364/480, 486

[56] References Cited

U.S. PATENT DOCUMENTS

| | | | |
|---|---|---|---|
| 4,099,109 | 7/1978 | Abbondanti | 318/227 |
| 4,290,104 | 9/1981 | Woehrle et al. | 364/480 |
| 4,348,734 | 9/1982 | Dougherty | 364/721 |
| 4,387,421 | 6/1983 | Zach et al. | 363/41 X |
| 4,466,052 | 8/1984 | Thrap | 363/41 |
| 4,466,070 | 8/1984 | Claussen | 363/41 X |
| 4,527,226 | 7/1985 | Glennon | 363/41 |

OTHER PUBLICATIONS

"A Digital Logic PWM Speed Control for Single and Polyphase AC Motors" by T. Masur.

Primary Examiner—Peter S. Wong
Attorney, Agent, or Firm—Wood, Dalton, Phillips, Mason & Rowe

[57] ABSTRACT

Prior inverter controls have been developed which are capable of controlling switches in an inverter to produce one of a plurality of polyphase output waveforms. Such controls utilize one or more memories to store a plurality of modulation patterns for controlling the switches. However, such types of inverter controls cannot provide individual phase regulation with the required degree of noise immunity. In order to overcome this problem, an inverter control according to the present invention includes a plurality of memories, one for each phase, each of which is subdivided into a plurality of memory blocks which store a number of bytes, each of which is eight bits in length. Each bit is a zero or one, with a zero representing a first output condition for the respective phase, such as a notch, and a one representing a second output condition, such as a pulse. Memory address decoding logic includes means for accessing a particular memory block in each memory in accordance with a control signal representing the desired waveform to be generated at each phase output. Also included are means for sequentially addressing the bytes within a memory block so that the bytes stored within the block are sequentially provided at an output of the memory. A multiplexer/latch latches a particular bit of each byte so that a control waveform is developed at the output of the latch. The control waveform is utilized to derive operating signals for switches in the respective inverter phase so that the desired waveform is generated. The inverter control of the present invention accomplishes individual phase regulation of the inverter output and is relatively immune to noise which can cause distortion in the output power.

15 Claims, 7 Drawing Figures

| Memory Position | Bit Position | | | | | | | |
|---|---|---|---|---|---|---|---|---|
| | 0 | 1 | 2 | 3 | 4 | 5 | 6 | 7 |
| 0 | 0 | | | | | | | |
| 1 | 0 | | | | | | | |
| 2 | 0 | | | | | | | |
| ⋮ | ⋮ | | | | | | | |
| 136 | 0 | | | | | | | |
| 137 | 1 | | | | | | | |
| 138 | 1 | | | | | | | |
| ⋮ | ⋮ | | | | | | | |
| 178 | 1 | | | | | | | |
| 179 | 0 | | | | | | | |
| 180 | 0 | | | | | | | |
| 181 | 0 | | | | | | | |
| ⋮ | ⋮ | | | | | | | |
| 283 | 0 | | | | | | | |
| 284 | 1 | | | | | | | |
| 285 | 1 | | | | | | | |
| 286 | 1 | | | | | | | |
| ⋮ | ⋮ | | | | | | | |
| 1868 | 0 | | | | | | | |
| 1869 | 1 | | | | | | | |
| 1870 | 1 | | | | | | | |
| ⋮ | ⋮ | | | | | | | |
| 1910 | 1 | | | | | | | |
| 1911 | 0 | | | | | | | |
| 1912 | 0 | | | | | | | |
| 1913 | 0 | | | | | | | |
| ⋮ | ⋮ | | | | | | | |
| 2044 | 0 | | | | | | | |
| 2045 | 0 | | | | | | | |
| 2046 | 0 | | | | | | | |
| 2047 | 0 | | | | | | | |

INVERTER CONTROL

TECHNICAL FIELD

The present invention relates generally to an inverter, and more particularly to a control for operating an inverter to produce one of a plurality of output waveforms.

BACKGROUND OF THE INVENTION

Inverters for converting DC power into AC power for energizing one or more loads typically include one or more inverter legs, each inverter leg in turn having a pair of controllable switches connected in series across the terminals of a DC power source. The inverter switches, which may be transistors or the like, may be operated by an inverter control circuit to produce a pulse width modulated, or PWM output at the inverter leg. This PWM output is converted into a sine wave by a filter and is utilized to energize the loads.

Prior inverter controls were capable of operating inverter switches to produce only one PWM output or pattern. However, it was found that changes in load power factor or variations in one or more operating parameters of the inverter resulted in the introduction of undesirable harmonics in the PWM output which require the use of a large output filter.

As a consequence of the above, inverter controls were developed which were capable of operating switches in an inverter to produce one of a plurality of PWM outputs. Such an inverter control is disclosed in Abbondanti U.S. Pat. No. 4,099,109. This patent discloses a memory in which is stored digital representations of a plurality of modulation patterns and means for addressing the memory in accordance with a signal to produce a desired one of the patterns. In a preferred form of this control, the memory stores digital signals representing a plurality of levels for each of a plurality of modulation patterns. These levels are sequentially developed at an output of the memory. Each level is compared to a digital ramp signal by a digital comparator. When the ramp signal reaches the level, a transition between zero and one levels in a modulation pattern is produced. The levels stored in the memory and the ramp signal therefore represent notch edges in the resulting PWM waveform.

The information stored in the memory represents the switching pattern required to reproduce one quadrant of a single phase output waveform. The switching patterns for the remaining quadrants and phases are derived by phase shifting and addressing code reversal.

One disadvantage of the Abbondanti control arises when it is used in a noisy environment. Should noise cause an alteration of the memory output, a large shift in the switching points for the PWM pattern can occur, thereby resulting in the introduction of significant distortion in the output.

Abbondanti suggests an alternative arrangement wherein a memory stores a series of zeroes and ones, with zeroes representing notches in the output and ones representing pulses in the output. The zeroes and ones are retrieved in real time to thereby produce the waveform sequentially by time increments. No circuitry, however, other than a memory is disclosed for accomplishing the above procedure.

Dougherty U.S. Pat. No. 4,348,734 discloses a digital controller for a power converter which includes a memory for storing digital representations of a plurality of switching patterns, each of which corresponds with a segment of a phase output waveform. A switching pattern is stored as a series of zeroes and ones in the memory, and the memory locations are sequentially accessed by means of an address generator having a ripple counter which accumulates pulses from a clock. The switching pattern is accessed in an appropriate fashion to synthesize the entire output waveform. The switching pattern segment lengths stored in the memory are disclosed as being in a range between 60° and 90° of the output, with the particular segment length being a function of the number of phases of the output power from the power converter.

Woehrle et al U.S. Pat. No. 4,290,108 discloses a control unit for a converter which operates in a fashion similar to the preferred embodiment disclosed by Abbondanti. Woehrle et al, in addition, discloses the use of a separate control means and memory for each of three phases to be produced by the converter so that independent control over each phase output can be accomplished. Also, this patent discloses that the transition points or notch edges for less than a whole period of the desired output waveform can be stored in the memory, a quarter period being preferred.

While each of the above patents discloses an inverter control which is capable of operating switches in a converter to produce one of a plurality of output waveforms, none of the art discloses such a control which can provide individual phase regulation and which is effective to maintain control over the output even in a noisy environment.

DISCLOSURE OF THE INVENTION

In accordance with the present invention, the disadvantages of prior controls for PWM inverters as discussed above have been overcome.

The inverter control of the present invention develops operating signals for switches in a polyphase inverter so that the inverter generates one of a plurality of inverter output waveforms for each phase. The control includes a memory for each phase which is subdivided into a plurality of memory blocks, each memory block storing a number of bytes each of which is eight bits in length. Each byte represents a time increment in the output waveform. Each bit is a zero or one, with a zero representing a first output condition for the respective phase, such as a notch, and a one representing a second output condition, such as a pulse. Memory address decoding logic includes means for accessing a particular memory block in accordance with a control signal representing the desired waveform to be generated. Also provided are means for sequentially addressing the bytes within a memory block, such means comprising a counter which accumulates pulses developed by a clock to generate addresses for the memory.

As the addresses are generated, the bytes in the accessed memory block are sequentially provided at an output of the memory. A multiplexer/latch selects a bit position and latches the bit at that position in each byte as the bytes are sequentially provided from the memory so that a phase control waveform is developed. The phase control waveform is used to derive operating signals for the switches in the respective inverter phase to produce the first 180° of the desired output waveform. Half cycle decoding logic is utilized to obtain the second 180° portion of the output from the information stored in the memory. The waveform generator is therefore capable of controlling an inverter to produce output waveforms having half-wave symmetry. The ability to generate waveforms having half-wave symmetry can result in reduced distortion in the output power as compared with inverters operated by prior controls.

Each phase memory is independently addressable by control signals derived from operating parameters of each phase so that independent phase regulation can be accomplished to handle steady state and/or transient, unbalanced loads, e.g. a fault on one or more phases.

Further, the use of individual phase memories each of which stores a plurality of zeroes and ones representing the condition of an inverter output and wherein each phase memory is separately addressable results in the advantage that individual phase regulation can be maintained even in extremely noisy environments.

BEST MODE FOR CARRYING OUT THE INVENTION

Figure 1:
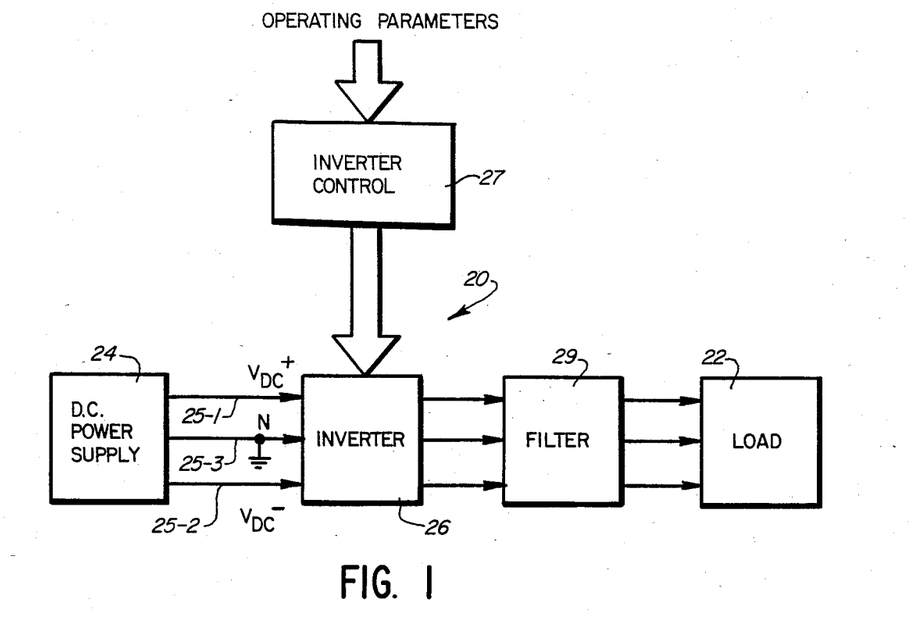
FIG. 1 is a block diagram of an inverter system for providing an AC output to a load.

Referring now to FIG. 1, there is illustrated an inverter system 20 which develops AC power for energizing one or more loads 22. While the inverter system 20 shown in FIG. 1 and in subsequent figures is illustrated as a three phase system, it should be understood that the system may develop a different number of phases, as desired.

A DC power supply 24 develops positive and negative DC voltages $V_{DC}{}^+$ and a neutral voltage N on buses 25-1, 25-2 and 25-3, respectively, which are in turn coupled to an inverter 26. The inverter 26 includes switches which are operated by an inverter control 27 to produce a pulse width modulated, or PWM, output. This PWM output is coupled through a filter 29 to the load 22.

Figure 2:
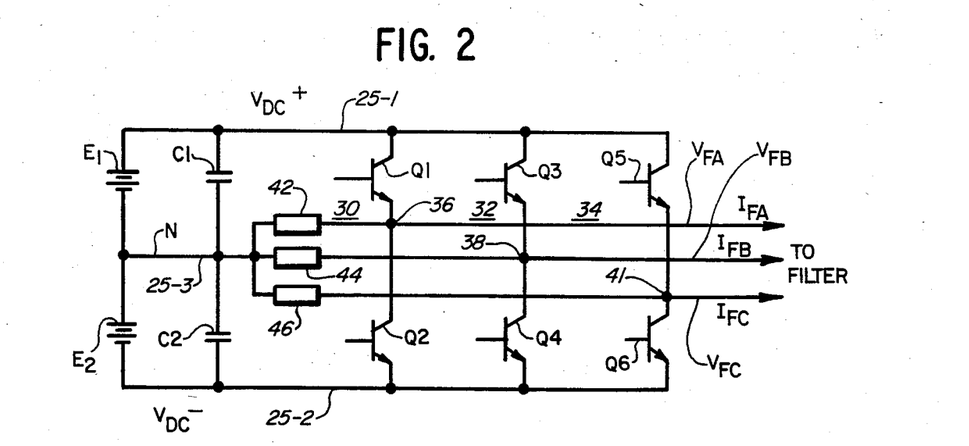
FIG. 2 is a simplified schematic diagram of the DC power supply and the inverter shown in FIG. 1.

Referring also to FIG. 2, the inverter 26 includes three inverter legs 30,32,34 each comprising two controllable power switches, such as switches Q1 and Q2, which are connected in series across the voltages $V_{DC}{}^+$ and $V_{DC}{}^-$. Each junction 36,38,41 between the switches of the legs 30,32,34, respectively, is coupled through a bi-directional switch 42,44,46 to the neutral voltage N.

Referring specifically to the inverter leg 30 as an example, the switches Q1 and Q2 are operated in accordance with a PWM waveform pattern developed by the inverter control 27 in interlocking fashion with the bi-directional switch 42 to produce a neutral-clamped PWM output voltage and current $V_{FA}$ and $I_{FA}$ at the junction 36. Likewise, phase outputs $V_{FB},I_{FB}$ and $V_{FC},I_{FC}$ are produced at the junctions 38,41, respectively, by operation of the switches Q3,Q4 and Q5,Q6 in the inverter legs 32, 34 in conjunction with the bi-directional switches 44,46.

For a more detailed description of the neutral clamped inverter disclosed in FIG. 2 herein, reference may be had to Glennon U.S. patent application Ser. No. 531,037, filed Sept. 12, 1983, entitled "Neutrally Clamped PWM Inverter", assigned to the assignee of the instant application and the disclosure of which is hereby incorporated by reference.

The DC power supply 24 is illustrated as comprising first and second series-connected DC sources $E_1$ and $E_2$ and first and second filtering capacitors C1 and C2. It should be noted that the DC voltages $V_{DC}{}^+$ and $V_{DC}{}^-$ might be provided in another fashion, such as by rectifying and filtering the output of an AC generator, if desired.

Figure 3:
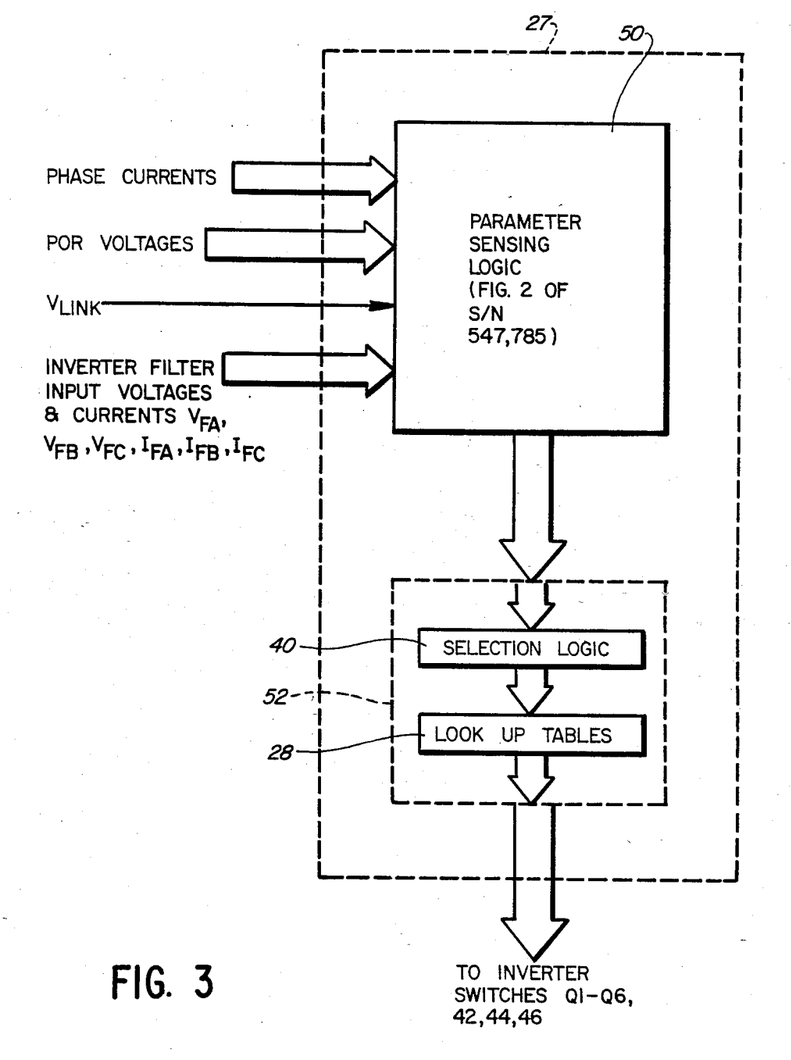
FIG. 3 is a block diagram of the inverter control shown in FIG. 1.

Referring now to FIG. 3, there is illustrated in block diagram form the inverter control 27 shown in FIG. 1. The inverter control 27 develops operating signals for switches in the inverter 26 to produce one of a plurality of PWM outputs in accordance with the sensed parameters. The inverter control 27 includes parameter sensing logic 50 which senses various operating parameters of the inverter, such as the currents developed in each of the phase outputs of the inverter, the phase voltages at a point of regulation, or POR, the voltage across the DC buses 25-1 andd 25-2, denoted $V_{LINK}$ and the phase voltages and currents at the input of the filter 29.

The parameter sensing logic 50 may be of the form disclosed in Glennon U.S. patent application Ser. No. 547,785, filed Nov. 2, 1983, now U.S. Pat. No. 4,527,226, entitled "Inverter Control System for Providing an Easily Filtered Output" and assigned to the assignee of the instant application, the disclosure of which is hereby incorporated by reference. The sensing logic 50 comprises the circuitry shown in FIG. 2 of that patent application with the exception of selection logic 40 and an angle set lookup table 28. These elements are replaced in FIG. 3 of the instant patent application by an angle set generator 52 including selection logic 40 and a plurality of lookup tables 28 which control the inverter switches Q1–Q6 and the bi-directional switches 42,44,46. The generator 52 generates phase control waveforms which are utilized to control the inverter switches based upon signals representing the normalized DC bus voltage derived from the sensed parameter $V_{LINK}$, the power factor for each phase at the input of the filter 29 as calculated from the phase voltages and currents at that point and a signal indicating that one of the phase currents exceeds a predetermined value, such as 2 p.u. or 200% of rated current. Of course, other parameters or less than all of the abovenoted parameters may serve as the basis for generation of the phase control waveforms, if desired.

The lookup tables 28 illustrated in FIG. 3 include a memory for each phase, each of which stores a plurality of angle sets. The angle sets define the angles, in electrical degrees, at which the inverter switches are to be turned on and off to control the inverter under various operating conditions to provide a waveform with easily filtered harmonics and voltage regulation to compensate for voltage drops occurring between the DC power supply and the load. It should be noted that the actual angle sets stored in the lookup tables 28, and the manner in which an address for a particular angle set is generated by the logic 40 as disclosed herein are exemplary only and form no part of the present invention.

Figure 4:
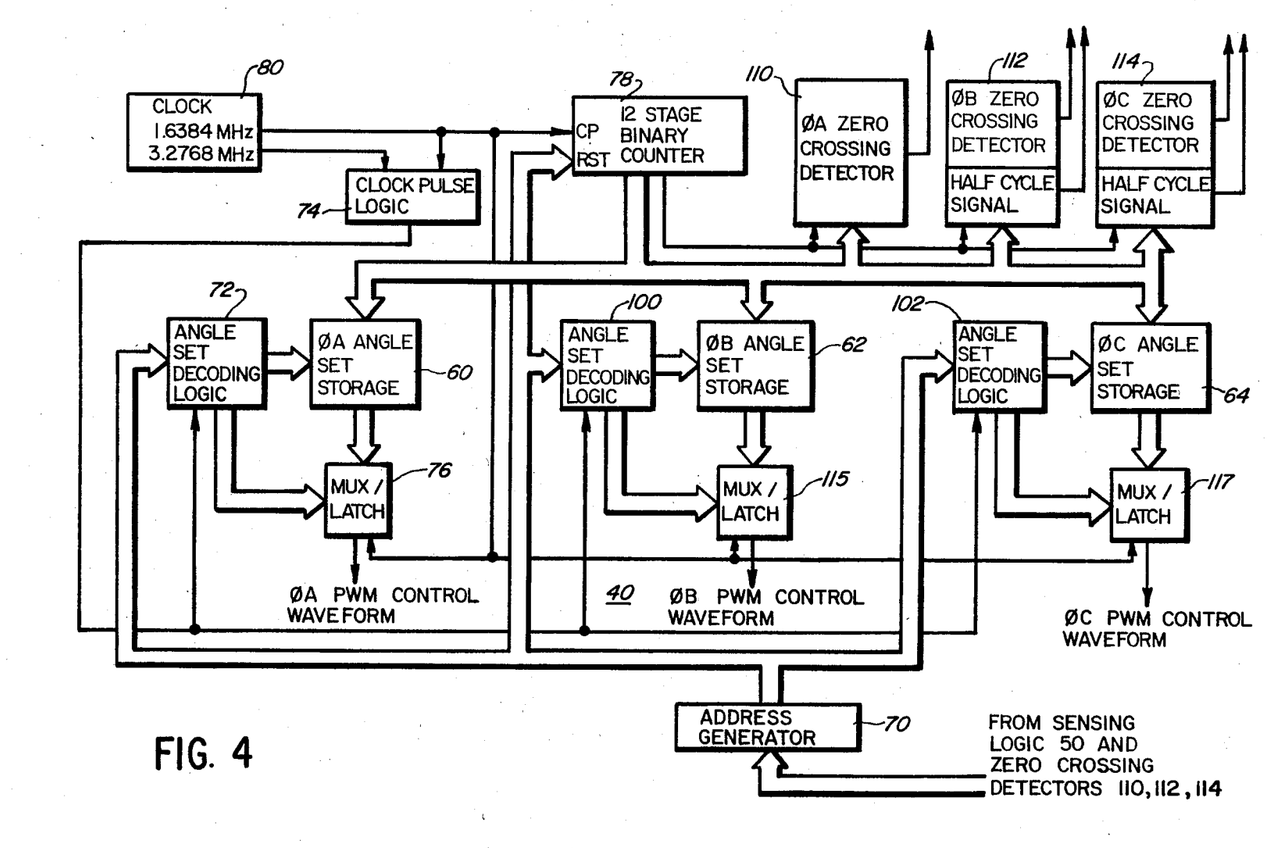
FIG. 4 is a block diagram of the angle set generator 52 shown in block diagram form in FIG. 3.

Referring now to FIG. 4, there is illustrated the selection logic 40 in conjunction with the lookup tables 28. In the preferred embodiment, the lookup tables 28 consist of three erasable programmable read only memories, or EPROM's 60,62,64, each of which stores a plurality of angle sets to control the switches in one leg of the inverter. Other memory types can be used if desired. Each memory includes a plurality of memory blocks, with each memory block storing a series of bytes each comprising a number of bits, such as eight, which may be either a zero or a one. A zero represents a first output condition of the respective inverter leg, e.g. a notch, while a one represents a second output condition, such as a pulse. In the instant application, a notch comprises an output level at or near zero while a pulse comprises either a positive or negative output level for the neutral topology shown in the figures. Alternatively, a zero could represent a pulse while a one represents a notch, if desired.

The selection logic 40 includes decoding logic for accessing a particular memory block based upon a control signal representing the desired angle set to be retrieved from the memory. Also included are means for sequentially addressing the memory locations in the accessed memory block so that the bytes within the block are sequentially provided at an output of the memory. A particular bit of each provided byte is latched to produce the respective phase control waveform. The phase control waveform is then utilized to derive the operating signals for the switches in the appropriate inverter leg.

Figure 5:
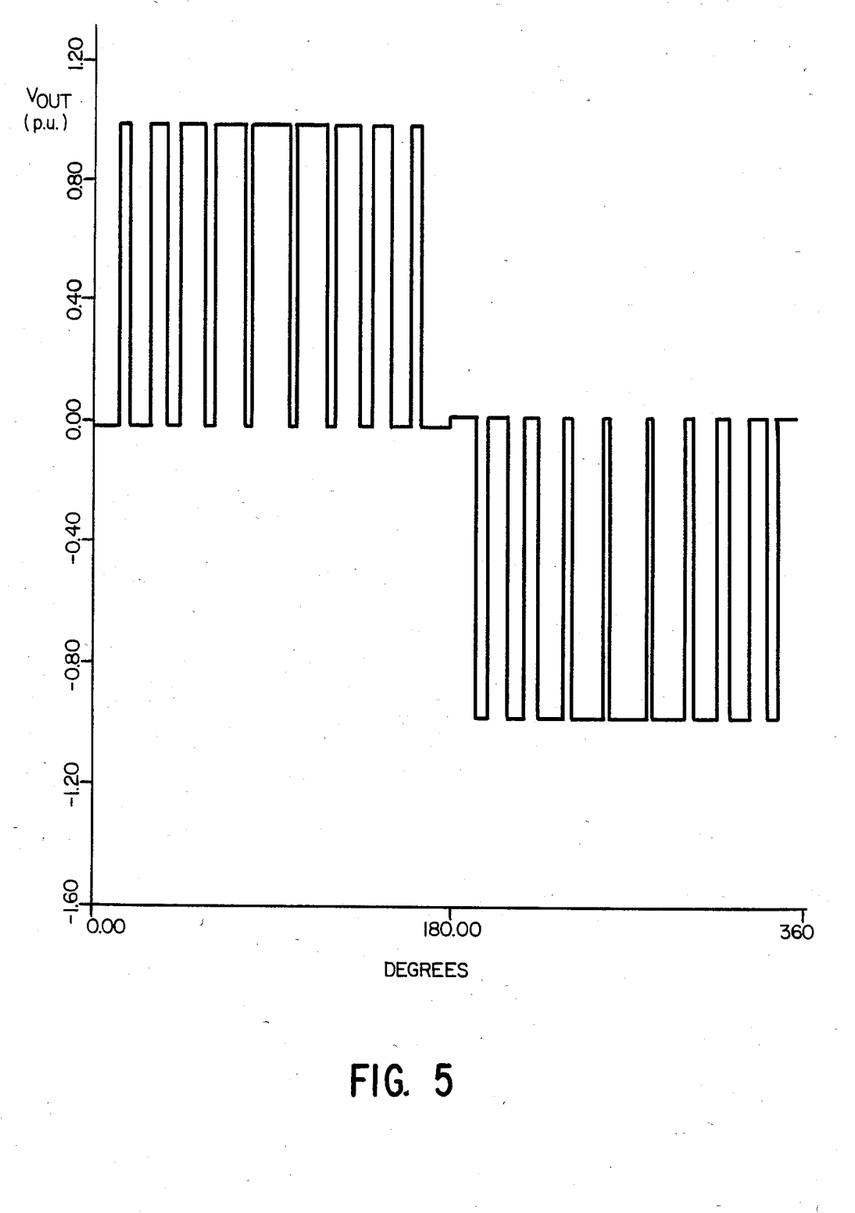
FIG. 5 is a sample waveform produced by the inverter system of FIG. 1.
Figure 6:
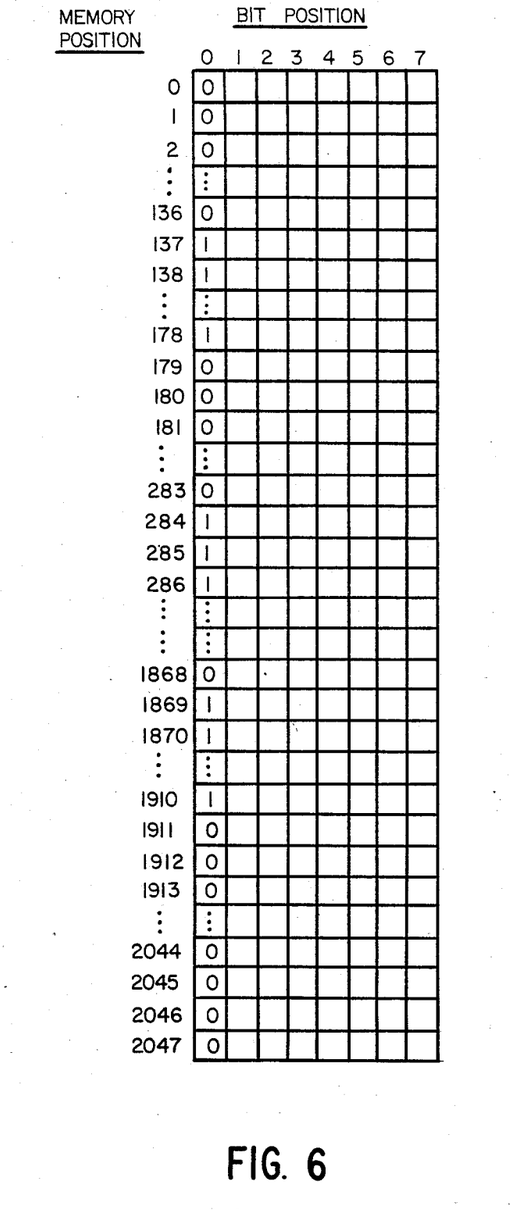
FIG. 6 is a map of a portion of the storage locations in one of the memories illustrated in FIG. 4.

For example, in order to produce the phase output shown in FIG. 5, a 2K block of memory such as that shown in FIG. 6 includes memory positions or locations 0–2047, each of which stores a byte in bit positions 0–7. The information required to reproduce each 180° of an output waveform is stored in a particular bit position of the 2048 bytes.

For the example shown in FIGS. 5 and 6, the resolution of the angle sets stored in the memory equals $180° \div 2048 \cong 0.09$. The resolution can be changed by changing the number of bytes which are stored in the memory for each 180° of the output to be reproduced.

Referring again to FIG. 4, the generation of a phase control waveform for phase A will now be described it being understood that the generation of phase control waveforms through the remaining phases is generally identical thereto with the exceptions noted below.

An address generator 70, which may be a microcomputer, develops a digital control signal comprising 12 bits of information based upon the output from the sensing logic 50. Nine of these bits in bit positions 1–9 of the 12 bit positions are coupled to angle set decoding logic 72 which controls the addressing of the memory 60. The angle set decoding logic 72 utilizes five of these nine bits in bit positions 1–5 to access the desired block of memory. Three of the remaining four bits in bit positions 6–8 are utilized by a multiplexer/latch 76 described below. The ninth bit in bit position 9 comprises a chip select or latching signal for phase A which causes the angle set decoding logic to latch new data from the address generator 70. This ninth bit is utilized in conjunction with a synchronizing signal developed by clock pulse logic 74 to change the accessing of the memory 60 at an appropriate time.

The use of five bits to access the appropriate block of memory means that one of 32 blocks of memory within each of the memories 60,62,64 can be selected. In the preferred embodiment, each memory includes 32 memory blocks each two kilobytes in length resulting in a capability of producing up to $32 \times 8 = 256$ angle sets for each phase.

The memory 60 also includes an input which is coupled to the output of a 12-stage binary counter 78 which comprises the sequential addressing means. The counter 78 in turn accumulates pulses developed by a clock 80. The eleven least significant bits of the output from the counter 78 are utilized to sequentially address the bytes within the memory block selected by the angle set decoding logic 72. The twelfth, or most significant bit is utilized to generate a phase A half cycle signal described in greater detail hereinafter.

The clock 80 generates two clock signals, one of which is twice the frequency of the other. The lower frequency clock signal comprises a circuit clock signal which is combined with the other clock signal in the clock pulse logic 74 to generate a pulse during each period of the circuit lock. The output of the clock pulse logic 74 is coupled to the decoding logic 72 to enable latching of data thereby when the chip select or latching signal for phase A is generated by the address generator and the pulse is produced during the circuit clock period. As noted more specifically below, this latching occurs at approximately the zero degree point in each respective phase output.

Once the information from the address generator 70 has been latched by the decoding logic 72, the memory locations in the memory block are sequentially addressed by the counter 78 at it accumulates clock pulses. The binary counter 78 generates an output at the eleven least significant bits which increases from zero to binary 2047 ($2^{11}=2048$). During this time, the phase A half cycle signal is in a low state. Upon receipt of the next clock pulse after binary 2047 is reached, the eleven least significant bits of the output from the binary counter 78 change to a low state while the half cycle switches to a high state. The eleven bit output of the counter then sequentially increases to binary 2047 again. This sequencing of the binary counter output results in the sequential addressing of the bytes within the memory block accessed by the decoding logic 72 so that the bytes are sequentially provided at the output of the memory. This sequential addressing occurs twice for each 360° of the phase output waveform.

As the bytes are sequentially provided at the output of the memory, the multiplexer/latch 76 selects a particular bit position and latches the bit stored at that position in each byte. The identity of the particular bit position is established by the three bit code from the digital control signal latched at the output of the decoding logic 72. The multiplexer/latch 76 receives the circuit clock signal at an enable input which insures the only valid data at the memory output is latched by the circuit 76. The sequential latching of a particular bit of the bytes in a memory block results in generation of a phase control waveform at the output of the multiplexer/latch 76.

Figure 7:
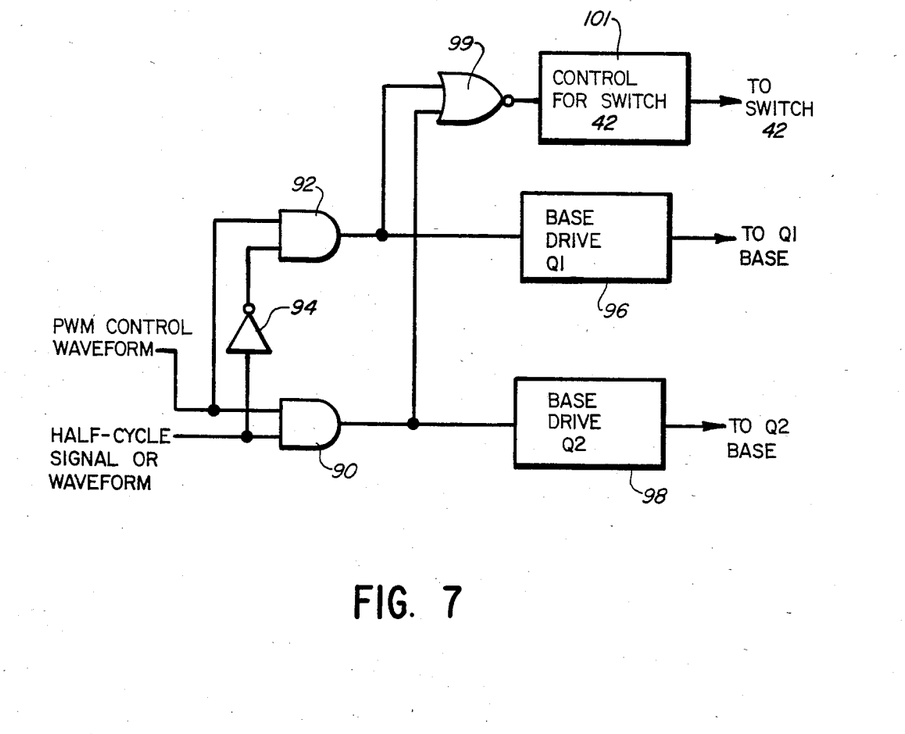
FIG. 7 is a schematic diagram of one of the circuits for deriving switch operating signals for the switches in the inverter shown in FIGS. 1 and 2.

The circuitry shown in FIG. 7 comprises means for deriving operating signals from the phase control waveform. The phase control waveform is coupled to a first input of each of a pair of AND gates 90,92. The half cycle waveform is coupled to a second input of the AND gate 90 and is coupled via an inverter 94 to the second input of the AND gate 92. The AND gate 92 is in turn coupled to a base drive circuit 96 for the switch Q1 while the output of the AND gate 90 is coupled to a base drive circuit 98 for the switch Q2.

The outputs from the AND gate 90,92 are combined by a NOR gate 99 which in turn develops operating signals for controlling the bi-directional switch 42.

The switches Q1, Q2 and 42 are thereby controlled to produce a PWM output waveform at the junction 36, such as the waveform shown in FIG. 5.

As illustrated by the example of FIGS. 5 and 6, for a circuit clock frequency of 1.6384 Mhz. and assuming a 400 hz. fundamental output frequency, the sequential latching of the data in bit position 0 of the memory block shown in FIG. 6 results in the PWM output shown in FIG. 5 having notch or pulse edges at the following approximate points in each 360°.

| | |
|---|---|
| 12.1 | 192.1 |
| 15.7 | 195.7 |
| 24.9 | 204.9 |
| 32.1 | 212.1 |
| 38.2 | 218.2 |
| 48.7 | 228.7 |
| 52.0 | 232.0 |
| 65.4 | 245.4 |
| 66.5 | 246.5 |
| 113.5 | 293.5 |
| 114.6 | 294.6 |
| 128.0 | 308.0 |
| 131.3 | 311.3 |
| 141.8 | 321.8 |
| 147.9 | 327.9 |
| 155.1 | 335.1 |
| 164.3 | 344.3 |
| 167.9 | 347.9 |

As previously noted, the angle set decoding logic 72 is capable of latching a new address from the address generator 70 only when a pulse is produced by the clock pulse logic 74 and the latching signal is developed by the address generator 70. This action occurs only once during a fundamental cycle, at approximately the zero degree point of the phase A output waveform. Once the latching signal at the ninth bit position of the information from the address generator 70 switches to a low state, the eight bits representing the memory block to be accessed and bit position to be latched cannot be changed until the latching signal reassumes a high state.

In a similar fashion, angle set decoding logic 100,102 for phases B and C, respectively, receive an angle set address developed by the address generator 70, which addresses are latched by the logic 100,102 only when a high state chip select or latching signal is provided at tenth and eleventh bit positions in the twelve bit digital control signal from the address generator 70, respectively.

The latching signals are generated by means of three zero crossing detectors 110,112,114 which decode the counter output to provide an end of cycle signal for each of phases A, B and C, respectively. The end of cycle signals from the circuits 110,112,114 are utilized to generate the latching signals transmitted by the address generator 70 as the ninth, tenth and eleventh bit positions, respectively. The signals are utilized to control the latching of the angle set decoding logic circuits 72,100,102, respectively. Specifically, when the end of cycle of one of the phases, for example phase B, is detected by the circuit 112, an end of cycle signal is generated which is transmitted to the address generator 70. In response to receipt of this signal, the address generator generates a new 5 bit address for the phase B memory 62 and a 3 bit code for a multiplexer/latch 115 based upon the phase B output current, the phase B POR voltage, the DC level $V_{LINK}$ and the phase B power factor as detected at the input of the filter 29. This address and code are assembled as the first eight bits of the twelve bits of information along with a high state latching signal in the tenth bit position. At this time, the ninth and eleventh bit positions are held in a low state. This data is transmitted by the address generator 70 to cause the decoding logic 100 to latch the eight bits comprising the address and code developed by the address generator 70 so that the appropriate block in the memory 62 is accessed. Since the address and code generated by the generator 70 are a function of the phase B operating parameters, control over the phase B output is maintained independently of the remaining phases.

The above-described latching by the phase B angle set decoding logic 100 does not in any way affect the accessing of the memories 60,64, or latching by multiplexer/latch circuits 76,117 since the latching of new information into the decoding logic circuits 72,102 for these phases occurs only when the end of cycle signal is generated for such phases. This means that the address generator 70 does not cause a new angle set to be generated for a particular phase until a change in one or more of the sensed parameters occurs and the end of cycle signal for that phase is generated.

Accordingly, individual phase regulation is accomplished so that unbalanced loads can be handled.

The displacement between phases in the output of the inverter is accomplished by offsetting the bit patterns stored in the memories 60,62,64 by the required amount. Specifically, the bit patterns stored in the phase B memory 62 are offset or displaced the equivalent of 120 electrical degrees lagging the bit patterns stored in the phase A memory 60. Similarly, the bit patterns stored in the phase C memory 64 are offset or displaced 120° lagging the bit patterns stored in the phase B memory 62.

The twelfth bit from the address generator 70 is coupled to a reset input of the binary counter 78. This bit is used to reset the counter and thereby restart the inverter system at a desired time to permit synchronized parallel operation with another inverter system or power supply.

The angle set decoding logic circuits 72,100, 102 and the multiplexer/latch circuits 76,115,117 may be implemented by commercially available integrated circuits manufactured by Fairchild Camera and Instrument Corporation of Mountain View, Calif., under part numbers 54LS374 and 54LS139, respectively.

It should be noted that the present invention is not limited to use with neutral clamped PWM inverters, but may be utilized with other types of inverters, as desired.

I claim:

1. An inverter control for developing operating signals for switches in an inverter to produce an output in accordance with a control signal, comprising:

a memory having a plurality of memory blocks, each memory block storing a series of bytes each comprising a number of bits which may be either a zero or a one, a zero representing a first output condition and a one representing a second output condition;

decoding logic coupled to the memory for accessing a particular memory block based upon the control signal;

a clock for generating a series of clock pulses;

means coupled between the clock and the memory for sequentially addressing the bytes within the accessed memory block as the clock pulses are generated so that such bytes are sequentially provided at an output of the memory;

a multiplexer/latch coupled to the memory output and responsive to the control signal for latching a particular bit of each provided byte so that a control waveform is developed at an output thereof; and means coupled to the multiplexer/latch for deriving the operating signals from the control waveform so that an output is produced which assumes the first and second output conditions.

2. The inverter control of claim 1, wherein the sequential addressing means comprises a counter for counting the clock pulses to derive a series of sequential addresses.

3. The inverter control of claim 1, wherein the inverter produces a polyphase output and wherein the control further includes a memory for each phase, decoding logic coupled to each memory for accessing a memory block therein, each memory being coupled to the sequential addressing means, a multiplexer/latch coupled to each memory output and an operating signal deriving means coupled to each multiplexer/latch.

4. The inverter control of claim 1, further including means for developing a half cycle signal indicating when a half cycle of the output has been produced and wherein the operating signal deriving means includes an AND gate for combining the half cycle signal and the control waveform to derive the operating signals.

5. The inverter control of claim 4, wherein the inverter includes two switches and wherein the operating signal deriving means includes a second AND gate for combining the control waveform with an inverted version of the half cycle signal, each AND gate controlling a switch in the inverter.

6. The inverter control of claim 1, wherein the inverter develops an AC output and wherein each memory block stores the information required to reproduce 180° of th AC output.

7. An inverter control for developing operating signals for switches in a polyphase inverter to produce one of a plurality of AC outputs in accordance with a control signal, the inverter including a plurality of legs each producing a phase output and including a pair of switches, comprising:

a plurality of memories, one for each phase, each memory having a plurality of memory blocks each of which stores a series of bytes, each byte comprising a series of bits each of which may be a zero or a one, a zero representing a first output condition and a one representing a second output condition for the respective phase;

a decoding logic circuit coupled to each memory for accessing a memory block in each memory based upon the control signal;

a clock for generating a series of clock pulses;

means coupled between the clock and the memories for sequentially addressing the bytes within each accessed memory block as the clock pulses are generated so that such bytes are sequentially provided at the outputs of the memories;

a multiplexer/latch coupled to each memory output and responsive to the control signal for latching a particular bit of each provided byte so that a plurality of phase control waveforms are developed at an output thereof; and means coupled to each multiplexer/latch for deriving a pair of operating signals for each inverter leg from the phase control waveforms, the pair of operating signals being used to control the pair of switches in the leg.

8. The inverter control of claim 7, wherein the sequential addressing means comprises a counter for counting the clock pulses to derive a series of sequential addresses.

9. The inverter control of claim 7, further including means for developing a half cycle signal for each phase output indicating when a half cycle of such output has been produced and wherein each operating signal deriving means includes first and second AND gates for combining the half cycle signal and the phase control waveform to in turn control the switches in the respective leg.

10. The inverter control of claim 7, wherein each memory block stores the information required to reproduce 180° of each phase output.

11. The inverter control of claim 7, wherein each decoding logic circuit includes means for accessing a different memory block in accordance with a new control signal only during a particular point in the phase output.

12. An inverter control for developing operating signals for switches in an inverter so that the inverter produces one of a plurality of pulse width modulated (PWM) outputs in accordance with a control signal, comprising:

a memory having a plurality of memory blocks, each memory block storing a series of zeroes and ones, a zero representing a first output condition and a one representing a second output condition, the series of zeroes and ones representing 180° of a particular PWM output;

means for developing a clock signal;

means coupled to the memory for repetitively accessing in sequential fashion the series of zeroes and ones in accordance with the clock signal to produce a control waveform; and means coupled to the accessing means for deriving the operating signals from the control waveform so that the particular PWM output is produced.

13. The inverter control of claim 12, wherein the accessing means comprises a counter having an input coupled to the clock signal.

14. The inverter control of claim 12, further including means for developing a half cycle signal indicating when a half cycle of the output has been produced and wherein the operating signal deriving means includes an AND gate for combining the half cycle signal and the control waveform to derive the operating signals.

15. The inverter control of claim 14, wherein the inverter includes two switches and wherein the operating signal deriving means includes a second AND gate for combining the control waveform with an inverted version of the half cycle signal, each AND gate controlling a switch in the inverter.

* * * * *